Patented June 23, 1925.

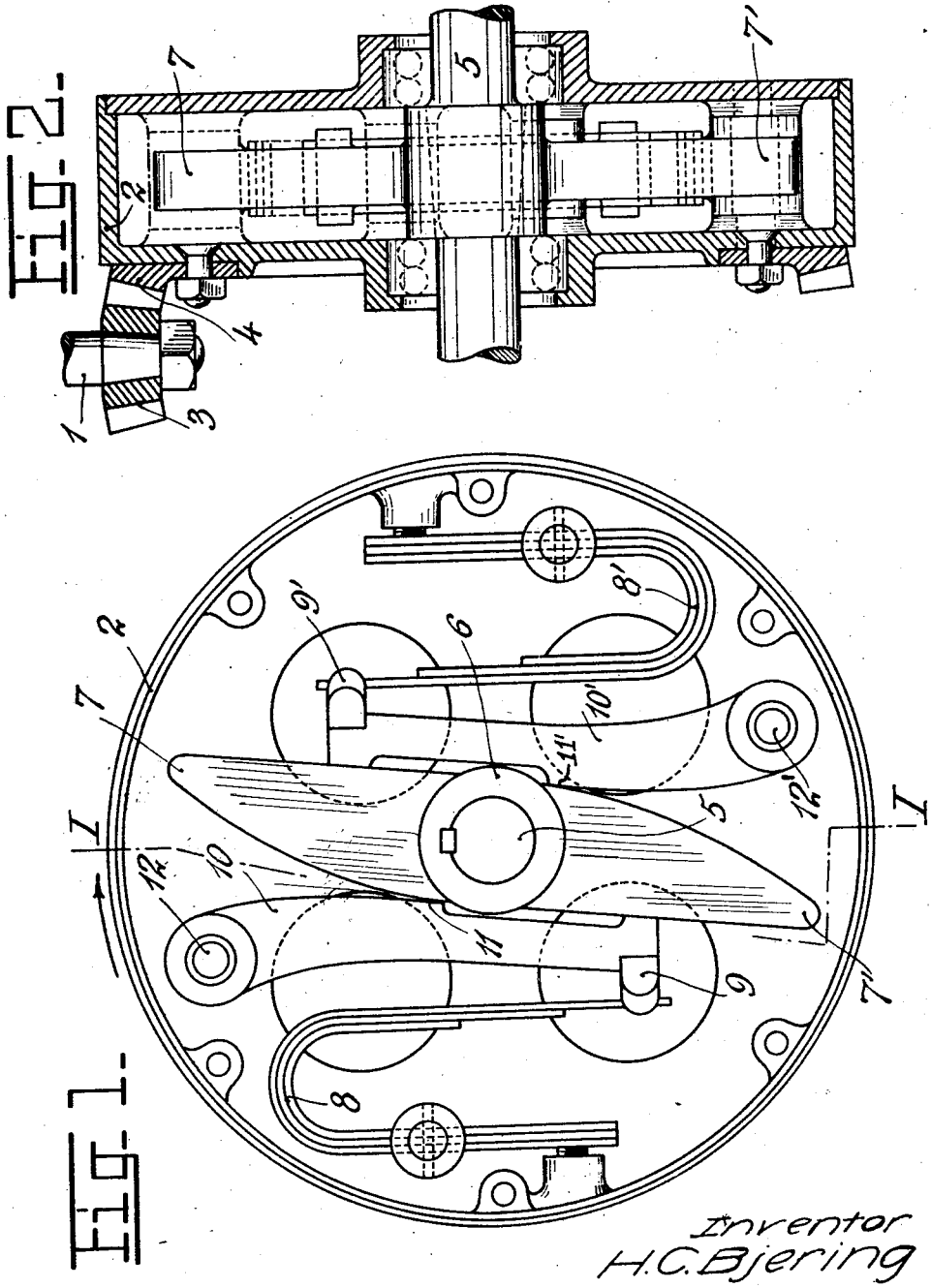

1,543,360

UNITED STATES PATENT OFFICE.

HANS CHRISTIAN BJERING, OF GJOVIK, NORWAY, ASSIGNOR TO A/S. AUTOSLAEDE, OF CHRISTIANIA, NORWAY.

CLUTCH.

Application filed May 26, 1924. Serial No. 716,019.

*To all whom it may concern:*

Be it known that I, HANS CHRISTIAN BJERING, a subject of the King of Norway, residing at Gjovik, Norway, have invented certain new and useful Improvements in Clutches; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a clutch of the kind, in which one or more elastic members are interposed between a driving and a driven part and serve to cushion the shock effected in starting, stopping and the like.

According to the invention the connection between the driving and driven parts is arranged in such a manner that their mutual point of action is displaced according as the elastic means is compressed, whereby the moment of torsion reaches its maximum when the elastic means has become completely compressed.

A constructional form of the invention—especially adapted for starting clutches for heavy loads such as railway trains, sleigh automobiles, trucks and the like is shown in the drawings, wherein;

Fig. 1 is a side view, and

Fig. 2 is a section on the line I—I of Fig. 1.

The driving force from a motor (not shown) is transmitted from the shaft 1 to the casing 2 through the medium of pinion 3 and toothed rim 4 on the outer side of said casing 2. The casing is idly mounted on the driven shaft 5, for instance by means of a ballbearing (indicated in dotted lines in Figure 2). Inside the casing a hub 6 is keyed to the shaft 5, said hub carrying two symmetrical arms 7, 7'. Inside the casing 2 springs 8 and 8' are attached, their free ends being surrounded by bows 9, 9' on two symmetrically arranged levers 10, 10' respectively. These levers are loosely pivoted to bolts 12, 12' and engage the arms 7, 7'. The drawing shows a position, wherein the springs are somewhat slacked.

When the motor is started the casing 2 is moved in the direction of the arrow in Figure 1, and the pressure from the casing is transmitted to the shaft 5 through the medium of the spring-pressed levers 10, 10'. As will be seen, the outer faces of these levers and the corresponding faces of the arms 7, 7' are shaped so as to perform a rolling motion on each other, according as the spring members 8, 8' are compressed. The point of action of the force thus is gradually displaced out and away from the contacting points 11, 11', until the springs are completely compressed and the levers 10, 10' transfer the pressure of the casing directly through the pivot bolts 12, 12' to the levers of the arms 7, 7'. It will be seen that in this arrangement the transmission of the full starting pressure to the driven shaft is effected gradually and without any shock, and by the gradual displacement of the point of action of the force on the shaft a correspondingly gradual increase of the moment of torsion up to a maximum is obtained.

It is obvious that the idea of the invention may also be carried out in other ways than that described and shown. Thus the levers 10, 10' may be dispensed with and the arms 7 may directly engage the elastic members which may consist of springs of any sort or of pneumatic, hydraulic or other braking members. The number of arms 7 may, of course, be varied, and the invention is not restricted to the transmission of the driving force by means of a casing. Only the essential features of the invention must be maintained, viz: the displacement of the point of action of the force, according as the pressure increases.

Claims—

1. An elastic clutch for power driven vehicles, comprising, a driving member, a driven member, line contacting rigid power transmitting elements in the driving and the driven members, means permitting a progressive variation in the pressure between the said elements, said elements being arranged so that their lines of contact progressively shift to increase the torsion moment therebetween accordingly as the pressure between said elements increases.

2. An elastic clutch for power driven vehicles, comprising, a driving member, a driven member, a power transmitting element on the driven member contacting with a power transmitting element on the driving member, elastic means arranged to cooperate with said elements, said elements being arranged so that the place of contact between them is progressively displaced, according as the elastic means is deformed, so that the moment of torsion therebetween gradually increases according as the pressure therebetween increases, the torsion moment reaching its maximum when the elastic means is at its greatest deformation.

3. An elastic clutch, comprising, a driven shaft, symmetrical arms fixed to the shaft, a driving member, resilient members symmetrically arranged in the driving member, pivoted levers connected to the driving member, and positioned between the arms and the resilient members to transmit power from the resilient members to the arms, each lever having one face arranged for rolling contact with one face of an arm during compression of the resilient members, whereby the places of contact and power transmission between the contacting faces of the arms and levers are gradually displaced toward the outer ends of the arms.

4. An elastic clutch for power driven vehicles, comprising, a driving member, a driven member, line contacting rigid power transmitting elements in the driving and the driven members, means permitting a progressive variation in the pressure between the said elements, said elements being arranged so that their lines of contact progressively shift to increase the torsion moment therebetween accordingly as the pressure between said elements increases, the drive changing from resilient to rigid as said lines of contact reach the position of maximum displacement.

5. An elastic clutch, comprising, a driven shaft, symmetrical arms fixed to the shaft, a driving member, resilient members symmetrically arranged in the driving member, pivoted levers connected to the driving member, and positioned between the arms and the resilient members, to transmit power from the resilient members to the arms, each lever having one face arranged for rolling contact with one face of an arm during compression of the resilient members, whereby the places of contact and power transmission between the contacting faces of the arms and levers are gradually displaced toward the outer ends of the arms, the arms contacting with the pivoted portions of the levers to thus change the character of power transmission from elastic to rigid.

6. An elastic clutch, comprising, a driven shaft, symmetrical arms fixed to the shaft, a driving member, resilient members symmetrically arranged in the driving member, pivoted levers connected to the driving member, and positioned between the arms and the resilient members, to transmit power from the resilient members to the arms, each lever having one face arranged for rolling contact with one face of an arm during compression of the resilient members, whereby the places of contact and power transmission between the contacting faces of the arms and levers are gradually displaced toward the outer ends of the arms, the arms contacting with the pivoted portions of the levers to thus change the power transmission path so as to eliminate the resilient members therefrom.

In testimony that I claim the foregoing as my invention, I have signed my name in presence of two subscribing witnesses.

H. CHR. BJERING.

Witnesses:
A. HUYDER,
DAGNY SYVERSEN.